US012633675B2

(12) United States Patent
Jeon

(10) Patent No.: US 12,633,675 B2
(45) Date of Patent: May 19, 2026

(54) ANTENNA MODULE

(71) Applicant: NEXWAVE INC., Daejeon (KR)

(72) Inventor: Jin-Wan Jeon, Daejeon (KR)

(73) Assignee: Nexwave Inc., Daejeon (KR)

( * ) Notice: Subject to any disclaimer, the term of this patent is extended or adjusted under 35 U.S.C. 154(b) by 244 days.

(21) Appl. No.: 18/383,478

(22) Filed: Oct. 25, 2023

(65) Prior Publication Data

US 2024/0178575 A1 May 30, 2024

(30) Foreign Application Priority Data

Nov. 29, 2022 (KR) ........................ 10-2022-0162984

(51) Int. Cl.
*H01Q 21/06* (2006.01)
*H01Q 13/10* (2006.01)

(52) U.S. Cl.
CPC ........... *H01Q 21/064* (2013.01); *H01Q 13/10* (2013.01)

(58) Field of Classification Search
CPC ............................. H01Q 21/064; H01Q 13/10
See application file for complete search history.

(56) References Cited

U.S. PATENT DOCUMENTS 10,763,217 B2 9/2020 Lee et al.
11,183,766 B2 * 11/2021 Jia ........................ H01Q 9/0457
2002/0158722 A1 * 10/2002 Maruhashi .............. H01P 5/185 333/246
2012/0235881 A1 * 9/2012 Pan ...................... H01Q 21/067 343/893
2014/0252595 A1 * 9/2014 Yen ....................... H01L 23/498 257/737
2016/0049723 A1 * 2/2016 Baks .................... H01Q 9/0457 343/848
2016/0056544 A1 * 2/2016 Garcia ................ H01Q 9/0407 343/725
2020/0014119 A1 * 1/2020 Kim ....................... H01Q 1/523
2022/0069442 A1 * 3/2022 Kim ......................... H04B 1/40

FOREIGN PATENT DOCUMENTS

JP 2001-102861 4/2001
KR 10-1581225 12/2015
KR 10-2019-0017607 2/2019
KR 10-2145219 8/2020

* cited by examiner

*Primary Examiner* — Hai V Tran
(74) *Attorney, Agent, or Firm* — PnK IP LLC

(57) ABSTRACT

Proposed is an antenna module including a slotted antenna having a slot through which an electromagnetic wave passes, and a package substrate allowing radio frequency integrated circuits (RFICs) to be disposed thereon, the package substrate having a signal transmission line connected to each of the RFICs and configured to transmit and receive an electromagnetic wave, wherein the slotted antenna and the package substrate are separately made and then the slotted antenna is mounted on the package substrate.

15 Claims, 6 Drawing Sheets

ANTENNA MODULE

CROSS REFERENCE TO RELATED APPLICATION

This application claims priority from and the benefit of Korean Patent Application No. 10-2022-0162984, filed on Nov. 29, 2022, which is hereby incorporated by reference for all purposes as if fully set forth herein.

BACKGROUND

Field

The present disclosure relates generally to an antenna module including a slotted antenna. More particularly, the present disclosure relates to an antenna module capable of improving a wireless communication performance in a millimeter wave band, increasing heat dissipation characteristics, and performing defect detection effectively.

Discussion of the Background

Wireless communication data traffic is rapidly increasing, and the performance of electronic devices related to wireless communication is improving. The development of related technologies, such as autonomous driving, VR/AR, IoT-related technologies, telemedicine, and ultra-high-resolution video transmission, which require rapid transmitting and receiving of large amounts of data on wireless networks, is accelerating, and to support this, 5G and millimeter wave band components and related technologies are more required.

Accordingly, in order to increase the amount of wireless communication data transmission, wireless communication components having high operating frequencies and extending frequency bandwidth are required.

In a radio frequency (RF) transmitter or receiver system for wireless communication, as a frequency band of the transmitted or received signal increases, the number of antennas must be increased so as to increase the output of a transmission/reception signal and improve a signal-to-noise ratio.

Accordingly, in the millimeter wave band for 5G, an antenna module is configured to perform beamforming or beam steering of arranging antennas in a plurality of arrays.

The antenna module or system that performs the function of forming and controlling an electromagnetic wave beam is typically composed of many antenna elements, integrated circuits, interconnection parts thereof, and control signal lines. The antenna module further includes a multi-layer structure of antenna elements, signal transmission structures thereof, radio frequency integrated circuits (RFICs) that perform a function of controlling the phase and amplitude of the signal such as beamforming, intermediate frequency mixing circuits, local oscillators, circuits related thereto, and control circuits, and bias circuits, etc.

These modules and systems are essential components of a wireless communication system, and significant development goals for these modules and systems are achieving high output power and low signal loss, excellent performance of a function such as beamforming, high receive sensitivity, low fabrication price, high compatibility, high scalability, and so on.

In addition, in ultra-high frequency bands such as 12-18 GHz, 24 GHz, 28 GHz, 39 GHz, and 60 GHz, an RF signal is easily absorbed. Signal loss thereof occurs in a signal transmission process, and the quality of wireless communication may be rapidly deteriorated.

Accordingly, antenna modules require these technologies such as implementing high gain and radiation efficiency of an antenna, minimizing the loss of a connection portion between the antenna and RFIC, minimizing mutual signal interference due to complex signal line arrangement, and implementing a proper distance between antenna elements in antenna arrays (usually 0.5 times a signal wavelength), etc.

Accordingly, the antenna module consists of multiple antennas in the form of an array, more RFICs, and their related circuits to increase its output power and perform its beamforming function as rf frequencies of the module increase.

Meanwhile, as the frequency band used becomes higher, the size of an antenna of a corresponding band and the width of a transmission line becomes smaller, and the integrated circuit becomes finer and more complicated.

In order to configure the antenna module by combining the antenna of a millimeter wave band with an integrated circuit such as an RFIC and a related circuit, an antenna array and the integrated circuit may be located on the uppermost layer of a substrate. However, in this method, as the number of antenna elements increases, the number of routings to be configured by being connected to an integrated circuit for each antenna increases, so that a distance between antennas is required to be increased. Accordingly, antenna arrangement for properly performing a function such as beamforming due to effective antenna array configuration is not possible.

In order to solve this problem, according to the existing Korean Patent No. 10-1581225, a dual side package is used, in which antenna elements are formed on the uppermost layer of a substrate, and their related integrated circuits or ball grid arrays (BGAs) are disposed on opposite sides of the substrate. Besides RFICs configured by being directly routed to the antenna elements, ICs for additional control and power supply are connected to a different package substrate through BGAs.

In this method, an array is formed with a plurality of antennas on the uppermost layer of the package substrate, and RFICs are formed in a face-up form on the opposite side of the same package substrate, and an input/output line of one RFIC is connected to each antenna element correspondingly.

A feeding line with an antenna is configured by using dielectric layers and metal layers inside the substrate.

This method of configuring the antenna module is called an antenna in package because the antenna is configured inside the package substrate, and has the advantage of reducing loss factors by configuring a signal transmission line between the antenna and the RFIC to be short.

In addition, since an integrated circuit such as an RFIC is on the opposite side of an antenna array, the control lines or power lines of the integrated circuit are not placed on the same plane as the antenna, and their connection lines may be placed inside the package.

On the other hand, additional passive elements and connectors routed to control and power lines are required to be connected with a different package substrate by using BGAs.

In addition, when an antenna structure is implemented as a multi-layered structure to improve antenna performance, or when a signal feeding structure of antenna is implemented as a multi-layered structure to avoid interference of control and power lines, such a structure is very complicated and electrical routing is complex when increasing the numbers of antennas, and the number of dielectric and metal layers within the package substrate rises significantly. When the number of dielectric and metal layers within the package substrate increases in this way, it is difficult to dissipate heat generated from the RFIC through the package substrate.

In addition, since both the antenna and the RFIC signal lines are formed on one package substrate, it is possible to identify the characteristics of RF signal lines and the antenna only in the form of the combination of the characteristics of the RF signal lines connected to the RFIC and the characteristics of the antenna. That is, it is impossible to evaluate the characteristics of only the antenna or to individually evaluate the characteristics of each RF signal line of the RFIC. Defects due to their design and manufacturing processes cannot be individually evaluated, so it is difficult to identify and reduce defects and improve yield. In addition, when a high-power device, such as an RFIC, and the attached parts and lines thereof have defects during the operation, there is no method for detecting defective portions by evaluating the defects. That is, when a characteristic deterioration problem such as a decrease in the output of one of the RFICs occurs, it is difficult to identify and replace an element having the problem, so the entire module must be replaced. In addition, in the dual-side package, when the uppermost antenna array is configured in a patch type, there is no method for measuring RF characteristics of each antenna.

In addition, since the antenna and the routing part of the control/power line of the RFICs are required to be configured within a package substrate together, there is a limitation in using a material suitable for the characteristics of the antenna for the substrate. That is, in the case of applying the package substrate of a material with low dielectric loss in an ultra-high frequency band, the package substrate is costly and has low mechanical rigidity. It has a limitation in being configured in multiple layers.

Accordingly, a method of manufacturing an antenna substrate and a PCB package substrate of RFICs and their related circuits separately and bonding the antenna substrate and the PCB package substrate was also presented.

According to Korean Patent No. 10-2145219, in order to provide an antenna module advantageous in antenna performance improvement and miniaturization when configuring the antenna module, a PCB package substrate on which ICs such as RFICs are disposed and related circuits are formed, and an antenna substrate on which an antenna array and a part of its feeding structure are formed are electrically connected to each other by a bonding method.

Generally, a feeding metal via connected to each antenna to transmit an RF signal, and a metal via connected to an RFIC to transmit an RF signal are electrically connected to each other to be fixed using a ball-shaped bump.

An antenna substrate and an integrated circuit package substrate are directly connected by a bump, or are connected by rearranging signal lines by having an interposer substrate therebetween. Still, a ball-shaped bump is necessarily used to connect electrically and fix package substrates to each other.

As the number of antenna elements increases, the number of bumps for signal transmission and substrate attachment increases. As operating frequency increases, the size of a required bump is also required to be decreased.

The method of connecting another package substrate on top of one package substrate is a kind of package on package method, and an antenna module is manufactured by separating an antenna substrate and a package substrate of ICs and their connected circuits. Thus, the material of the antenna substrate and the material of the semiconductor package substrate may be different.

Accordingly, in order to improve antenna characteristics such as gain, an antenna and its feeding structure may be effectively designed in multiple metal layers, and a substrate material for an antenna and its feeding part may also be effectively selected.

However, additional manufacturing processes are required, such as connecting each signal line vias and each ground vias with their corresponding bumps, and the formation of multiple bumps may be very complicated when manufacturing multiple arrays.

In addition, impedance mismatch may occur due to bumps for connecting antenna signal lines, which may increase RF signal loss. In addition, in a bonding structure between each package substrate, a substrate is bent due to heat generated by ICs for high output and a mismatch in thermal expansion coefficients of the substrate. Due to this bending of the substrates, there are many defects in which the bonding of the bumps easily deteriorates when the bumps are used for a long time.

The above information disclosed in this Background section is only for understanding of the background of the inventive concepts, and, therefore, it may contain information that does not constitute prior art.

SUMMARY

Accordingly, the present disclosure has been made keeping in mind the above problems occurring in the related art, and the present disclosure is intended to propose an antenna module that can have a high performance in a super frequency band of 10 GHz or higher.

In addition, the present disclosure is intended to propose an antenna module which is composed of a slotted antenna with a slot and a package substrate on which radio frequency integrated circuits (RFICs) are disposed, and one surface of the slotted antenna and one surface of the package substrate are in contact with each other so as to have high gain, radiation efficiency, and high heat dissipation characteristics.

In addition, the present disclosure is intended to propose an antenna module in which the slot and a signal connection part are placed to face each other between the antenna and the package substrate to transmit a radio communication signal through coupling so that no bump bonding structure used for connecting the antenna and package substrate to each other is net required, and thus defects of signal loss and poor bump connection occurring when using bumps are decreased.

Furthermore, the present disclosure is intended to propose an antenna module, in which the antenna and the package substrate are separately manufactured and connected to each other to constitute the antenna module after inspecting the characteristics of the antenna and the package substrate individually.

In addition, the present disclosure is intended to propose an antenna module which is configured such that the antenna and the package substrate can be connected to or separated from each other so that the characteristics of the signal connection part of the package substrate are individually inspected to detect the defects of the signal connection part and the radio frequency integrated circuits connected thereto.

Additionally, the present disclosure is intended to propose an antenna module, in which a ridge-forming protrusion is formed in the slot of the slotted antenna so as to reduce the size of the slot capable of transmitting and receiving electromagnetic waves corresponding to operating frequency so that the placement of the slot can be facilitated or the transmission and reception performance of electromagnetic waves can be improved.

Furthermore, the present disclosure is intended to propose an antenna module, in which the slot of the slotted antenna with a dielectric to reduce the size of the slot capable of transmitting and receiving electromagnetic waves corresponding to operating frequency so that the placement of the slot can be facilitated or the transmission and reception performance of electromagnetic waves can be improved.

In addition, the present disclosure is intended to propose an antenna module, in which a signal transmission line connected to the input/output part of the radio frequency integrated circuits is placed inside the package substrate, and a ground layer is placed on one surface of the package substrate to face the signal transmission line so that a radio communication signal is reflected to improve the transmission efficiency of the signal.

In addition, the present disclosure is intended to propose an antenna module, in which a signal coupling pattern is disposed on one surface of the package substrate in contact with the slotted antenna so as to locate the signal coupling pattern at the slot of the slotted antenna, and the coupling of radio signals is strengthened so that the transmission of the radio communication signal can be performed more efficiently.

In addition, the present disclosure is intended to propose an antenna module, in which a heat dissipation part is coupled to at least one side surface of the slotted antenna and the package substrate so that heat dissipation characteristics are improved.

Furthermore, the present disclosure is intended to propose an antenna module, in which trenches are formed on the lower side of the slotted antenna so that the routing and placement of components and lines within the substrate are efficient.

In addition, the present disclosure is intended to propose an antenna module, in which the outside of the slotted antenna is formed of a metal material but the inside thereof is formed of a material with lower density than the outside so that heat dissipation is efficient and weight of a device is lowered.

In addition, the present disclosure is intended to propose an antenna module, in which a fixing hole through which the slotted antenna and the package substrate are aligned and fixed to each other is formed to facilitate the alignment and fixing of the slotted antenna with the package substrate so that a manufacturing process is simplified and time required for the process is reduced.

Additional features of the inventive concepts will beset forth in the description which follows, and in part will be apparent from the description, or may be learned by practice of the inventive concepts.

According to one aspect of the invention, an antenna module includes: a slotted antenna having a slot through which an electromagnetic wave passes; and a package substrate allowing radio frequency integrated circuits (RFICs) to be disposed thereon, the package substrate having a signal transmission line connected to each of the RFICs and configured to transmit and receive an electromagnetic wave, wherein the slotted antenna is mounted on the package substrate.

The slotted antenna and the package substrate may be separately made and then the slotted antenna may be mounted on the package substrate.

The slot may include a plurality of slots spaced apart at predetermined intervals from each other in the slotted antenna to form an array.

The package substrate may include a shielding part disposed in a form surrounding the signal transmission line.

The shielding part may include: a plurality of ground layers formed in dielectric layers constituting the package substrate, and shield vias connecting the ground layers to each other.

One ground layer of the plurality of ground layers may be disposed to face the slot with the signal transmission line placed between the one ground layer and the slot.

The shielding part may be disposed in a form surrounding the slot to form a signal transmission part in a center of the shielding part.

The slotted antenna may include a ridge-forming protrusion protruding toward the slot.

The ridge-forming protrusion may include a plurality of ridge-forming protrusions.

The slotted antenna may include a slot closing member provided in the slot, wherein the slot closing member may be a dielectric.

The slot closing member may have a permittivity greater than or equal to 2 and less than or equal to 10.

The package substrate may include a coupling part configured to guide the movement of an electromagnetic wave between the signal transmission line and the slot.

The slotted antenna may include trenches formed on a lower surface of the slotted antenna facing the package substrate.

An outer surface of the slotted antenna may be formed of a conductor, and an inside of the slotted antenna may be formed of a material having a density lower than a density of the conductor.

The antenna module may further include: a heat dissipation part coupled to a side surface of at least one of the slotted antenna and the package substrate.

The slotted antenna may include a fixing recess formed on the lower surface of the slotted antenna facing the package substrate, and the package substrate may include a fixing hole drilled in a vertical thickness direction, wherein a fixing bolt may be fastened to the fixing recess and the fixing hole.

The slotted antenna may include a fixing bar formed on the lower surface of the slotted antenna facing the package substrate, and the package substrate may include the fixing hole drilled in the vertical thickness direction, with the fixing bar being coupled to the fixing hole.

According to the antenna module of the present disclosure, the slotted antenna having the slot for transmitting and receiving a radio communication signal and the package substrate on which the RFICs are integrated are placed in contact with each other to transmit the radio communication signal, thereby having high gain and high radiation efficiency.

According to the antenna module of the present disclosure, the slotted antenna having the slot and the package substrate on which the RFICs are disposed are placed in contact with each other to transmit a radio communication signal, thereby eliminating the process of manufacturing multiple fine electrical connection structures between the antenna and the signal transmission line of the RFIC.

According to the antenna module of the present disclosure, the slotted antenna having the slot and the package substrate on which the RFICs are disposed are placed in contact with each other to transmit a radio communication signal, thereby preventing the separation of an electrical connection structure of the antenna substrate and the package substrate due to excessive heat generation.

According to the antenna module of the present disclosure, since the antenna having the slot and the package substrate on which the RFICs are disposed are applied to implement the antenna module, the package substrate for circuit implementation can be manufactured separately regardless of the antenna characteristics, thereby enabling the use of a substrate material more suitable for the circuit implementation.

According to the antenna module of the present disclosure, the dissipation of heat generated from the antenna module is facilitated by applying the slotted antenna whose front or outer surface is a conductor, thereby improving heat dissipation characteristics and preventing the reduction of output.

According to the antenna module of the present disclosure, the slotted antenna and the package substrate are separately manufactured and connected to each other to realize the antenna module so that defective products can be detected by measuring and analyzing the characteristics and defects of the antenna, or individually measuring and analyzing the characteristics and defects of the package substrate, each of the RFICs, and each signal transmission line connected thereto, thereby improving manufacturing yield.

In addition, the ridge-forming protrusion is formed in the slot of the slotted antenna to reduce the size of the slot through which electromagnetic waves corresponding to operating frequency can be transmitted and received, thereby facilitating the placement of the slot or improving the transmission and reception performance of electromagnetic waves.

In addition, the slot of the slotted antenna is filled with a dielectric having a higher permittivity than air, thereby minimizing the size of the slot.

In addition, the signal transmission line of the RFIC is placed inside the package substrate, and the ground layer is placed on one surface of the package substrate to face the signal transmission line to reflect the radio communication signal, thereby further improving the transmission efficiency of the signal.

In addition, a signal coupling pattern is disposed on one surface of the package substrate in contact with the slotted antenna so as to locate the signal coupling pattern at the slot so that the coupling of the signal is strengthened, thereby improving signal transmission efficiency.

In addition, trenches are formed on the lower side of the slotted antenna, and the RFICs, integrated circuit chips, passive elements, and or connector mounted to the package substrate can be placed on a surface in contact with the slotted antenna, thereby making the routing and placement of the components and signal lines within the package substrate effective.

Furthermore, the heat dissipation part having a heat dissipation fin can be coupled to the edge of the antenna module so that heat dissipation is performed more efficiently, thereby preventing deterioration of output loss and deformation of the substrate.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1A:
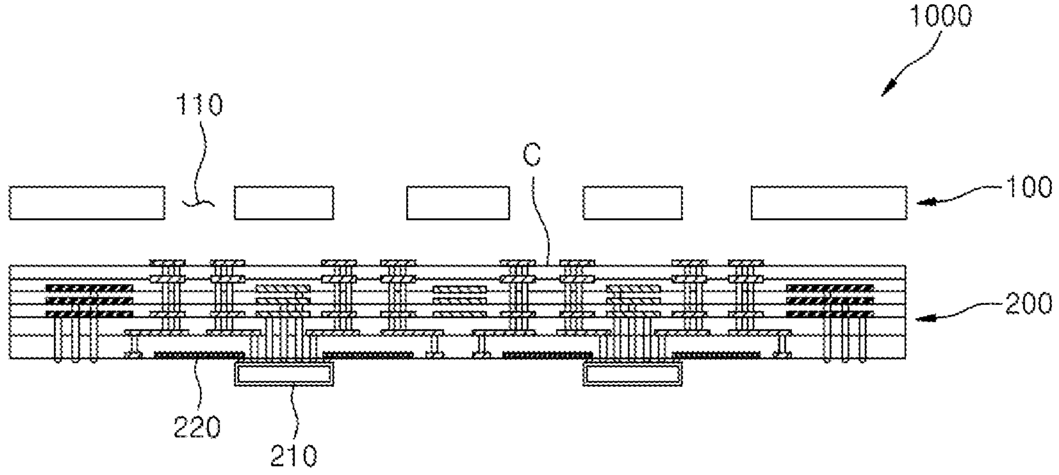
FIGS. 1A, 1B, 2A, and 2B are views illustrating a first embodiment of the antenna module of the present disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/of" includes any and all combinations of one or more of the associated listed items.

Although the terms "first," "second," etc. may be used herein to describe various types of elements, these elements should not be limited by these terms. These terms are used to distinguish one element from another element Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, an antenna module 1000 according to the present disclosure will be described with reference to the accompanying drawings.

Figure 3:
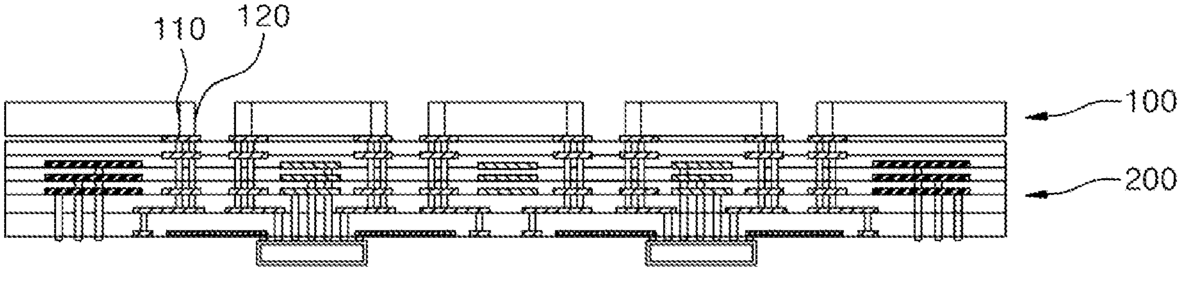
FIGS. 3 and 4 are views illustrating a second embodiment of the antenna module of the present disclosure.
Figure 4:
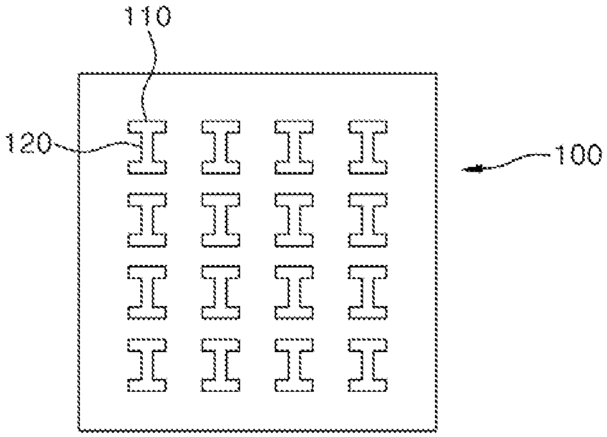
Figure 5:
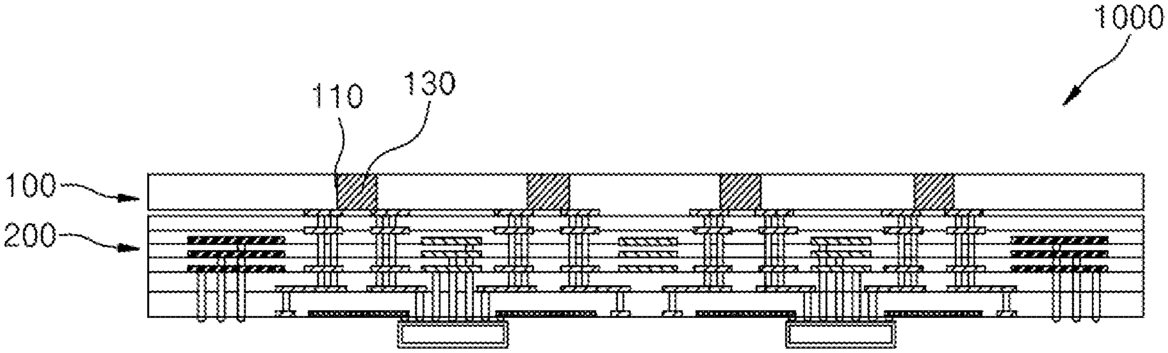
FIGS. 5 and 6 are views illustrating a third embodiment of the antenna module of the present disclosure.
Figure 6:
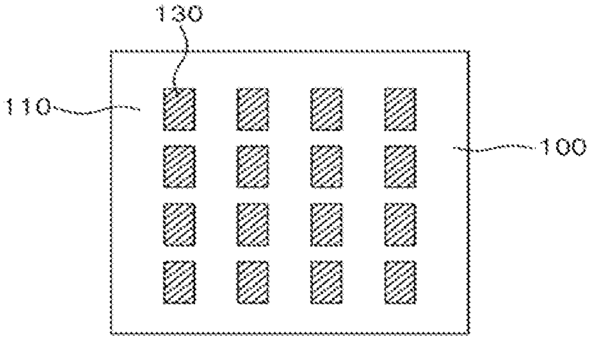
Figure 7:
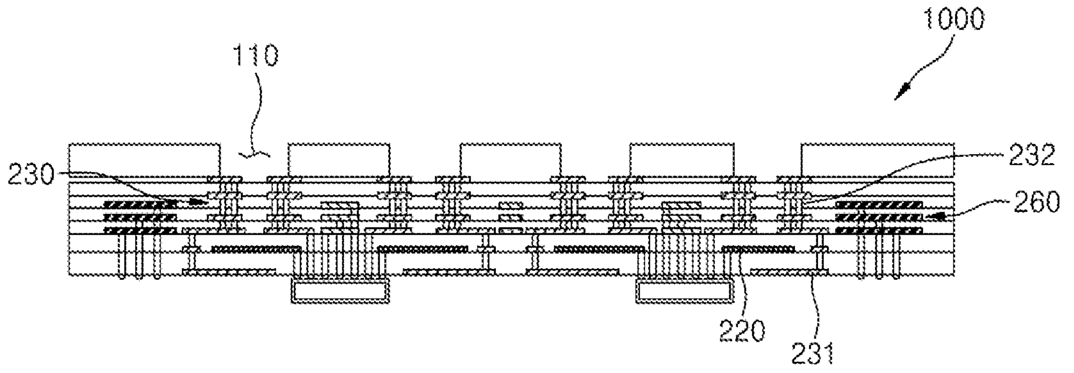
FIG. 7 is a view illustrating a fourth embodiment of the antenna module of the present disclosure.
Figure 8:
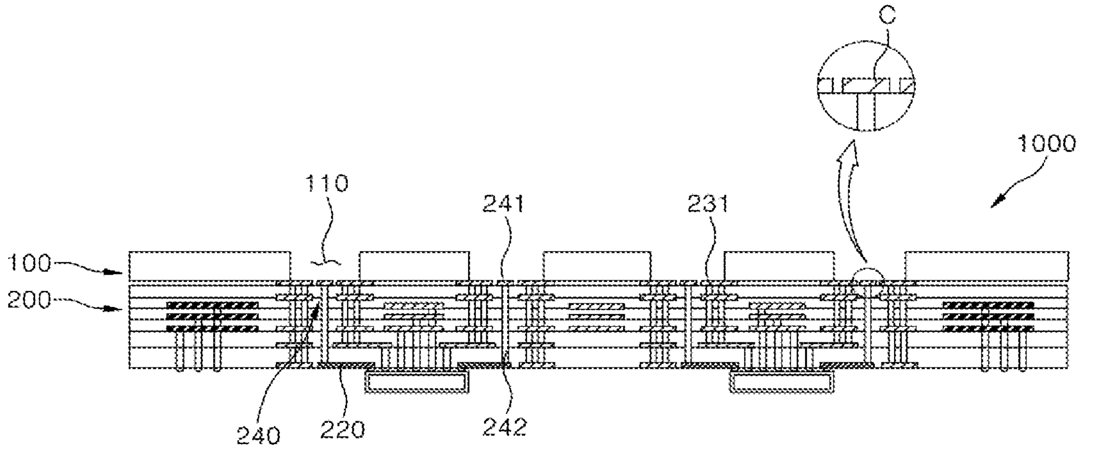
FIG. 8 is a view illustrating a fifth embodiment of the antenna module of the present disclosure.
Figure 9:
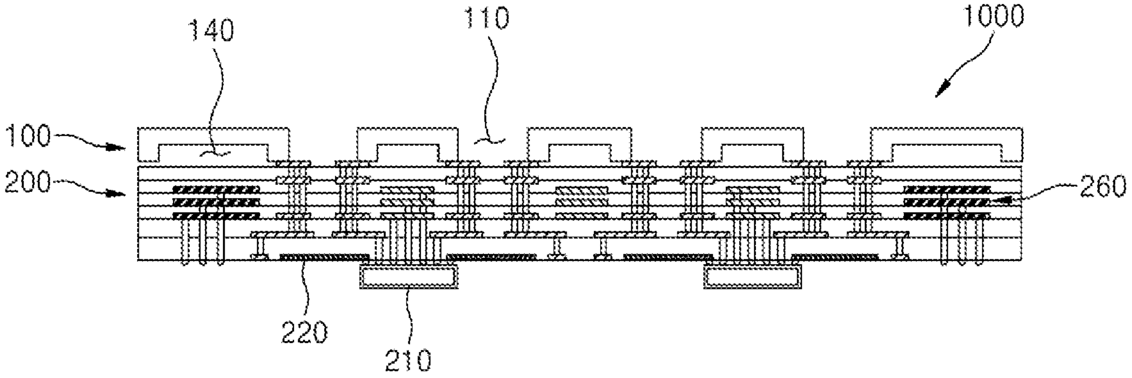
FIG. 9 is a view illustrating a sixth embodiment of the antenna module of the present disclosure.
Figure 10:
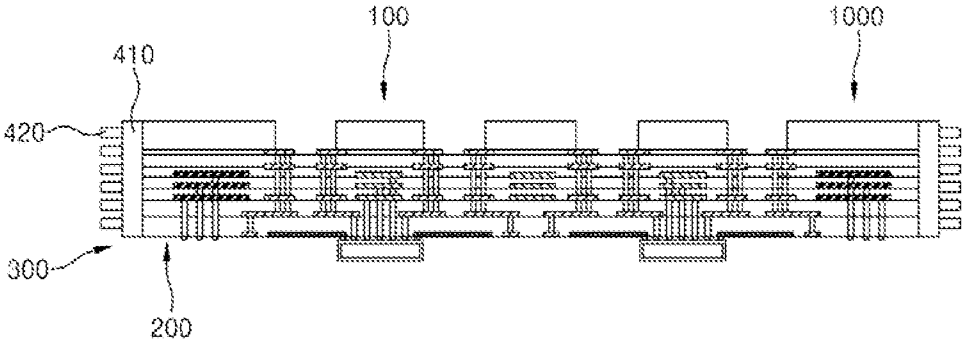
FIG. 10 is a view illustrating a seventh embodiment of the antenna module of the present disclosure.
Figure 11:
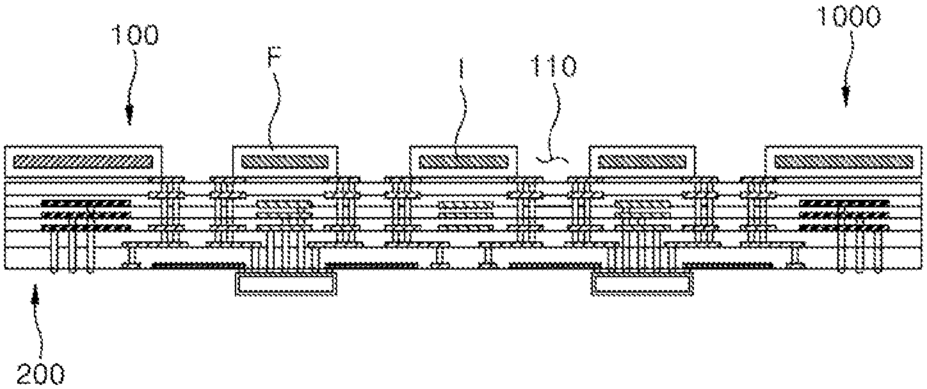
FIG. 11 is a view illustrating an eighth embodiment of the antenna module of the present disclosure.
Figure 12A:
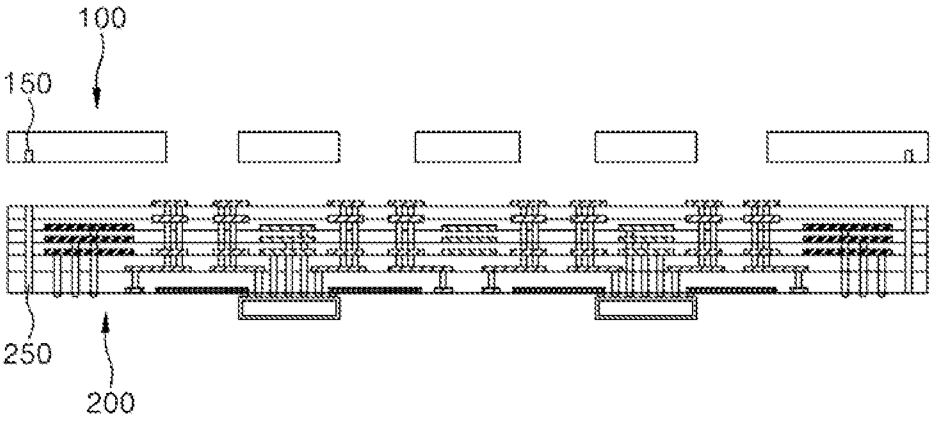
FIGS. 12A and 12B are views illustrating a ninth embodiment of the antenna module of the present disclosure.
Figure 12B:
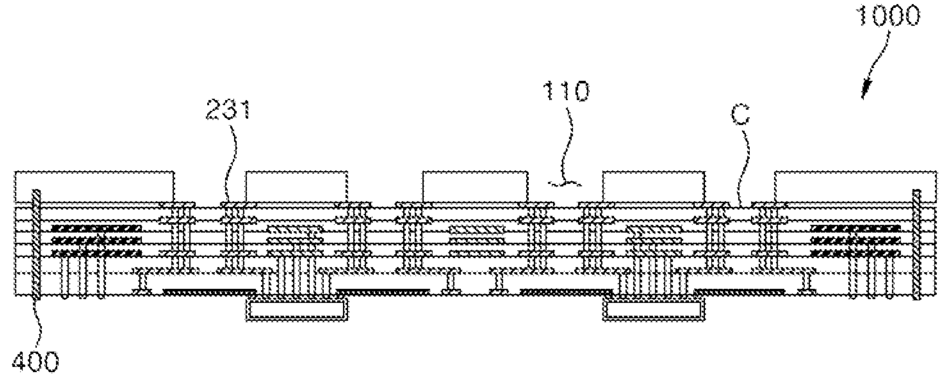
Figure 13A:
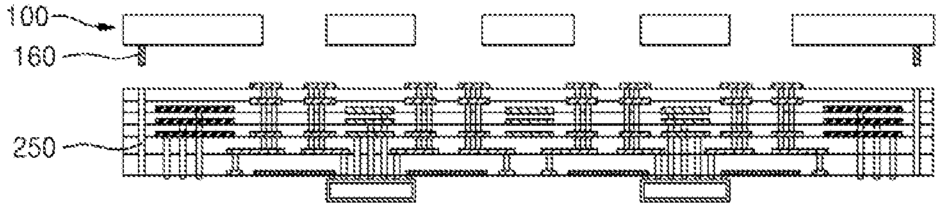
FIGS. 13A and 13B are views illustrating a tenth embodiment of the antenna module of the present disclosure.
Figure 13B:
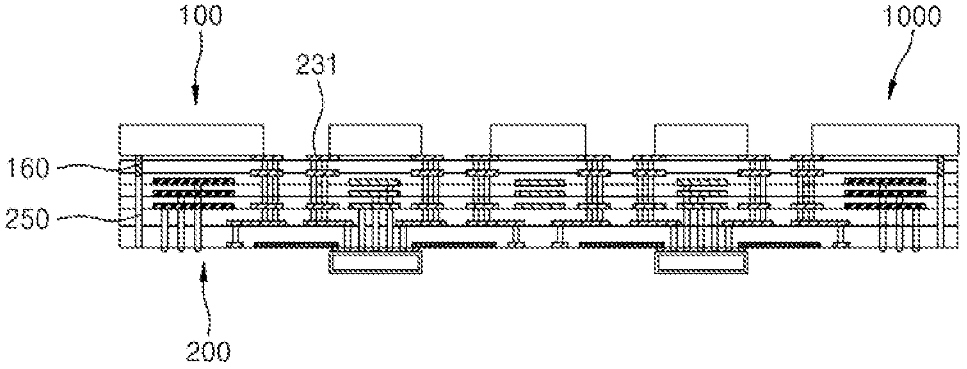

FIGS. 1A, 1B, 2A, and 2B are views illustrating a first embodiment of the antenna module of the present disclosure; FIGS. 3 and 4 are views illustrating a second embodiment of the antenna module of the present disclosure; FIGS. 5 and 6 are views illustrating a third embodiment of the antenna module of the present disclosure; FIG. 7 is a view illustrating a fourth embodiment of the antenna module of the present disclosure; FIG. 8 is a view illustrating a fifth embodiment of the antenna module of the present disclosure; FIG. 9 is a view illustrating a sixth embodiment of the antenna module of the present disclosure; FIG. 10 is a view illustrating a seventh embodiment of the antenna module of the present disclosure; FIG. 11 is a view illustrating an eighth embodiment of the antenna module of the present disclosure; FIGS. 12A and 12B are views illustrating a ninth embodiment of the antenna module of the present disclosure; and FIGS. 13A and 13B are views illustrating a tenth embodiment of the antenna module of the present disclosure.

In the following description, "a radio communication signal" and "electromagnetic waves" are all defined in advance to represent signals for communication.

Referring to FIGS. 1A, 1B, 2A, and 2B, the antenna module 1000 according to the first embodiment includes: a slotted antenna 100 in which one or more slots 110 through which electromagnetic waves are transmitted and received are formed and arranged in an array form; and a package substrate 200 having signal transmission lines 220 coupled to RFICs 210 and configured to transmit a signal of the RFIC 210, and a signal connection part C corresponding to the slot 110 of the slotted antenna 100 one-to-one.

Here, the RFIC 210 may refer to a radio frequency integrated circuit (RFIC) chip, and the signal connection part C may include an uppermost surface of the package substrate 200 through which electromagnetic waves are radiated or received.

The slotted antenna 100 has a structure in which one or more slots 110 are arranged in an array form, and electromagnetic waves are radiated or received through the slots 110. In the slotted antenna 100, the size and structure of the slot 110 determine the frequency band of transmitted electromagnetic waves, and the slot 110 operates as an antenna transmitting and receiving the electromagnetic waves. Thanks to the slotted antenna, the electromagnetic waves in a desired frequency band can be effectively radiated or received.

The slot 110 is preferably implemented as a conductor such as metal on the side surface of the slot so that electromagnetic waves are transmitted without signal loss, and is preferably configured so that electromagnetic waves can be efficiently transmitted vertically in a form in which the slot is empty by being formed through the upper and lower sides of the slot.

That is, the slot 110, which has a shape similar to the shape of a well-known waveguide, may have a slender rectangular shape in a top plan view as illustrated in 2A, a "U" shape having one ridge-forming protrusion formed on one side surface, or an "H" shape having a ridge-forming protrusion formed on each of opposite side surfaces.

The slotted antenna is also called a slotted waveguide antenna. The slotted antenna may be implemented as a flat plate with a low height, be easily manufactured at low cost, and has the advantage of higher gain and higher radiation efficiency than a widely used microstrip patch antenna.

On the other hand, the slotted antenna is required to have a relatively large slot space in the same operating frequency band compared to the size of a microstrip patch antenna formed on a widely used dielectric substrate. It may be difficult to design when the slotted antenna is implemented in an array form.

Accordingly, to implement the slotted antenna having a plurality of slots 110 in an array form to configure the antenna module, the size of the slot 110 and the arrangement of the signal connection part C must be properly designed.

In addition, in the slotted antenna 100, to decrease the size of the slot 110, the slot 110 may have a ridge formed therein or have a dielectric-filled therein.

Figure 1B:
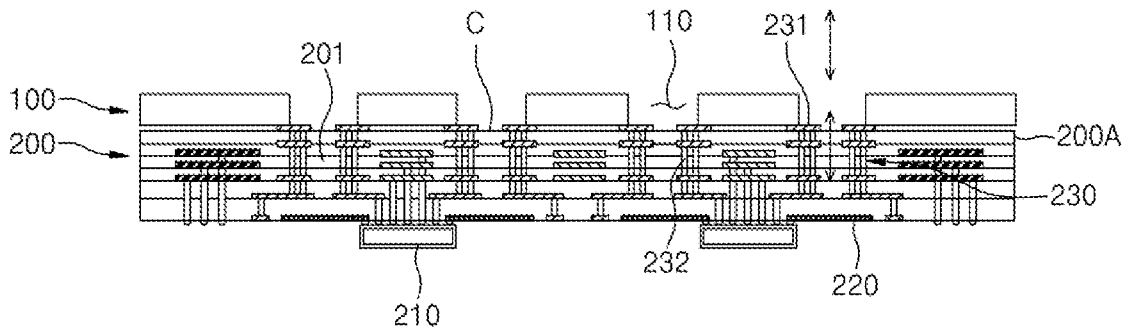

Referring to FIGS. 1A and 1B, the package substrate 200 includes a shielding part 230 disposed in a form surrounding the signal transmission line 220, wherein the shielding part 230 may include a plurality of ground layers 231 formed in dielectric layers 200A constituting the package substrate 200, and shield vias 232 connecting the ground layers 231 to each other.

In addition, the signal connection part C formed on one surface of the package substrate 200 may be surrounded by each ground layer 231 and may be disposed to face the slot 110.

In detail, by coupling the slotted antenna 100 and the package substrate 200 to each other so that the slot 110 and the signal connection part C face each other, a signal transmission structure in which the signal of the RFIC 210 of the package substrate 200 moves through a signal transmission part 201, the signal connection part C, and the slot 110 formed in the center of the shielding part 230 is formed, so that transmission loss of a radio communication signal can be minimized, and signal interference between a radio communication signal transmitted between another antenna and the signal transmission line 220 and an analog signal used for device operation can be blocked.

In this case, the shielding part 230 is arranged to surround the signal transmission part 201, and blocks a signal passing through the signal transmission part 201 from interfering with an external signal. The shielding part 230 may include the plurality of ground layers 231 formed in the dielectric layers 200A constituting the package substrate 200, and the shield via 232 connecting the ground layers 231 to each other.

In addition, the signal transmission part 201 mentioned above refers to a specific area of the package substrate 200 surrounded by the shielding part 230, and may include a plurality of signal transmission part formed by corresponding to the input/output ports of the RFIC 210.

As for the transmission of a signal by antenna in the antenna module 1000, when an ultra-high frequency signal in an operating frequency band is transmitted from the RFIC 210 disposed on the package substrate 200 through the signal transmission line 220, the signal is transmitted to the signal connection part C formed on one surface of the package substrate through the signal transmission part 201 surrounded by the plurality of shield vias 232, and is transmitted from the signal connection part C to the slot 110 of the slotted antenna 100 so that electromagnetic waves having characteristics such as a pre-designed frequency band and abeam width are radiated through the slot. As for reception of a signal by the antenna performed through a reverse process, electromagnetic waves of specific frequencies are received through the slot, and the received signal is transmitted to the RFIC.

The package substrate 200 to which the RFIC 210 is mounted may be manufactured in a multi-layered form of one or more dielectric layers 200A, and may be formed in a heterojunction form in which various materials are combined as needed.

Furthermore, the package substrate 200 may include various integrated circuit chips (ICs) such as a power amplifier and a mixer, various passive elements such as an inductor, a capacitor, and a resistor, and multiple connectors for connection in addition to the RFICs and the signal transmission lines.

In the package substrate 200, metal layers and connection vias may be formed, and signal transmission lines for transmitting a radio communication signal by using the metal layer and connection vias, metal wiring for routing power and control signals, a ground layer, and a shielding structure may be disposed.

The package substrate 200 transmits various analog signals such as power and control signals as well as signals in a high-frequency band. It may be composed of the RFIC 210, various integrated circuit chips, passive elements, and connectors, etc. Accordingly, the package substrate is required to have a low dielectric loss factor so that signal attenuation in the radio frequency band is low, to have excellent mechanical strength so that the substrate does not bend due to various processes and heat generation, and to be low in a material price since the package substrate is required to be manufactured in a multi-layered structure for implementing the substrate.

In addition, as the radio frequency band increases, the degree of integration of elements increases and it is more complicated to implement wiring, so the characteristics of the above requirements are further critical.

However, a material such as Teflon, which is mainly used due to low dielectric loss at ultra-high frequencies, has poor mechanical strength and is very expensive when implemented in multiple layers. A material such as FR4, which is used cheaply at low frequencies, has relatively excellent mechanical rigidity and is easy to be implemented in multiple layers, but are difficult to be applied since the material has considerable dielectric loss at ultra-high frequencies.

Accordingly, when one dielectric material is applied, it is difficult to satisfy these various requirements. Accordingly, the substrate of a heterojunction structure is implemented by applying heterogeneous dielectric materials. But it is difficult to implement a multi-layered structure and the manufacturing cost dramatically increases.

In addition, in the case of the multi-layered package substrate made of ultra-high frequency low-loss materials such as Teflon, which has poor mechanical rigidity, there is a disadvantage in that defects such as bending of the substrate due to heat during long-term use occur.

Figure 2A:
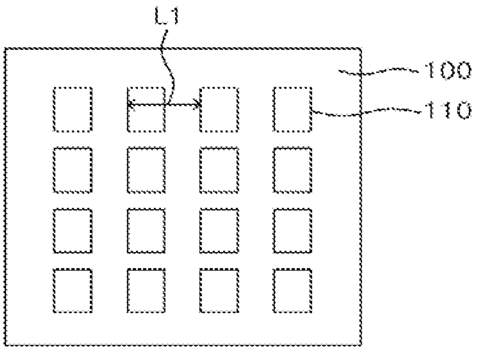
Figure 2B:
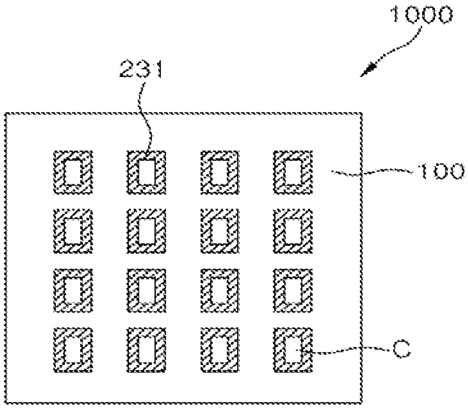

FIG. 2A is a top plan view of the slotted antenna 100, and FIG. 2B is a top plan view of the antenna module in which one surface of the slotted antenna 100 and one surface of the package substrate 200 having the signal connection part C are disposed to be in contact with each other.

Referring to FIGS. 2A and 2B, the slot 110 of the slotted antenna 100 corresponds one-to-one with the signal connection part C of the package substrate 200, and one surface of the slotted antenna 100 is disposed to be in contact with one surface of the package substrate 200 having the signal connection part C.

In addition, the ground layer 231 formed on one surface of the package substrate 200 is positioned at the edge of the slot 110, and the signal connection part C disposed at the center of the ground layer is aligned with the slot so that the radio communication signal is transmitted. FIG. 2B illustrates a case in which the slot is larger than the signal connection part in order to explain a positional relationship therebetween, but the size of the signal connection part may be equal to or larger than the size of the slot.

In addition, it is recommended that the ground layer 231 of the package substrate and the surface (a conductive layer) of the slotted antenna 100 are connected to each other without a gap therebetween to completely shield a connection portion with which the slotted antenna 100 and the package substrate 200 are in contact, thereby preventing loss of electromagnetic waves at the connection portion.

In this case, the slot 110 of the slotted antenna 100 is configured as a conductor whose outer wall or whole is made of metal and is empty inside like a waveguide, and enables electromagnetic waves to be efficiently transmitted up and down in a resonance mode to the upper and lower sides of the slot.

That is, space defined by the slot 110 is a path through which electromagnetic waves move, or one surface of the slot 110 in contact with the package substrate 200 functions to allow signals to be coupled and transmitted by corresponding one-to-one to the signal connection part C of the package substrate 200, and the other surface of the slot functions as an antenna which radiates and receives electromagnetic waves in the space.

In addition, when a plurality of slots 110 forms a slot array, a gain of an antenna may be increased and a beamforming function of adjusting a radiation angle of an antenna beam may be performed. In such a slot array antenna, it is preferable that an arrangement period Li between the slots is formed at half the wavelength (0.5 times) of a frequency band mainly used in consideration of the antenna array gain and beam angle adjustment, etc., and may be formed at other intervals such as 0.55 times and 0.6 times as needed. These intervals may be adjusted according to the arrangement space of the RFIC and related circuits.

Summarizing what has been described above, in the antenna module 1000 according to the first embodiment of the present disclosure, the slot 110 performs the role of an antenna to reduce the transmission loss of a signal and improve the radiation efficiency of the antenna. That is, in the case of an antenna module of an existing invention in which an antenna array is formed in the form of a multilayered metal layer formed on the upper side of a dielectric substrate or is configured in the form of including multiple transmission layers, loss of a radio signal occurs due to the dielectric loss of a dielectric constituting an antenna structure loss of radio signal. Accordingly, it is obvious that the gain and radiation efficiency of the antenna of the previous antenna module are lowered compared to the antenna module to which the slotted antenna of the present disclosure is applied.

In addition, since the slot 110 and the signal connection part C of the package substrate 200 through which a radio communication signal passes are in contact with each other, electromagnetic waves are transmitted through coupling, so no longer electrical connection structures such as bumps, which were required to be formed for electrical connection between the antenna and the signal transmission line connected to the RFIC as in the previous antenna module are required.

In the drawing, the slot 110 and the signal connection part Care illustrated to be spaced apart from each other due to the ground layer 231, but since the ground layer 231 is usually a very thin layer having a thickness of several to hundreds of micrometers or less, substantially, the slot 110 is not prevented from being in close contact with the signal connection part C.

According to the present disclosure, since a packaging process for forming a plurality of ball-shaped bumps can be omitted through the removal of the electrical connection structures (ball-shaped bumps) described above, the process of the antenna module can be simplified.

In addition, in the antenna module of the present disclosure, electromagnetic waves are coupled and transmitted between the slotted antenna 100 and the package substrate 200 through the slot 110 and the signal connection part C through which a radio communication signal passes, and accordingly, it is possible to prevent the separation of the electrical connection structures, such as fine ball-shaped bumps connecting an antenna substrate and a package substrate to each other, due to heat generated when the previous antenna module is operated for a long time.

In addition, the slotted antenna 100 and the package substrate 200 provided with the RFIC 210 can be implemented separately, so that a substrate material with better mechanical properties can be used for the package substrate 200 regardless of the characteristics and manufacturing of the antenna.

In addition, the slotted antenna 100 of the present disclosure is formed as a conductor such as metal in the front or outer surface of the antenna. Thus, heat generated from the high-power semiconductor integrated circuit chip of the package substrate 200 is efficiently dissipated through the slotted antenna 100, thereby preventing output reduction due to heat generation.

In addition, the slotted antenna 100 of the present disclosure is formed as a conductor such as metal in the front or outer surface. Thus, the interference of signal transmission through each slot can be prevented by shielding various signals of the package substrate 200.

In addition, in the antenna module 1000 of the present disclosure, the slotted antenna and the package substrate are individually manufactured and connected to each other, and thus it is possible to detect defective products by measuring and analyzing the characteristics and defects of the slotted antenna 100, or by individually measuring and analyzing the characteristics and defects of the package substrate 200, each RFC 210, and each signal transmission line 220 connected thereto, thereby improving manufacturing yield.

To explain again, manufacturing the antenna module 1000 of the present disclosure may be performed by manufacturing the slotted antenna 100, manufacturing the package substrate 200, and coupling the slotted antenna 100 and the package substrate 200 to each other as illustrated in FIG. 1B after aligning the slotted antenna 100 and the package substrate 200 manufactured as illustrated in FIG. 1A.

In this case, in an inspection process, the states of the slotted antenna 100 and the package substrate 200 are determined to remove defective products so that the antenna module in which the regular slotted antenna 100 is mounted on the regular package substrate 200 in the subsequent mounting can be manufactured.

Referring to FIGS. 3 and 4, the slotted antenna 100 of the antenna module according to the second embodiment may include the ridge-forming protrusion 120 protruding from a side surface of the slot so that the slot 110 has an "Iƒ" shape.

In detail, by forming the slot into an "Iƒ" shape through the ridge-forming protrusion 120, the size of the slot 110 may be reduced, the frequency band of an electromagnetic wave passing through the slot 110 may be adjusted, or the transmission characteristics of an electromagnetic wave may be improved.

The slot 110, which serves to transmit and receive electromagnetic waves in the slotted antenna 100, has a disadvantage in that the size of the slot required to secure a wide frequency band is larger than the size of the patch of a patch antenna. Accordingly, in the slotted antenna 100, the ridge-forming protrusion 120 is formed on the side surface of the slot 110 to reduce the size of the slot 110, increase the transmission frequency band, and improve transmission characteristics.

In this case, as illustrated in FIG. 4, the ridge-forming protrusion 120 is preferably equally positioned on both the left and right sides of the slot 110 to make the characteristics of a beam radiated or received from the slotted antenna 100 uniform. In one embodiment, the ridge-forming protrusion 120 may be equally formed on both left and right sides of the slot 110 so that the shape of the slot 110 has an "H" shape.

Referring to FIGS. 5 and 6, the slotted antenna 100 of the antenna module according to the third embodiment includes a slot closing member 130 provided in the slot 110, wherein the slot closing member 130 may be a dielectric.

In detail, since the slot 110 of the slotted antenna 100 is an empty space, air is used as a medium through which a radio communication signal is transmitted. Still, when air is used as the medium, the size of the slot 110 is required to be a specific size or more. Accordingly, in the present disclosure, the slot closing member 130, which has a higher permittivity than air, is filled in the slot 110 so that the slot 110 can have the same transmission capability of the radio communication signal even if the size of the slot 110 is reduced.

The structure and size of the slot 110 must be designed to match the frequency band of the antenna module 1000. In the case of the slot 110 in which air with a permittivity of 1 is used, the slot 110 is formed to be larger compared to a case in which the slot is filled with a material with high permittivity.

When the antenna module is implemented with a slot reduced in size, it is easy to arrange relatively multiple slots 110, and the arrangement of the slotted antenna 100 can be facilitated by using a space defined by forming a trench on the lower surface of the slotted antenna 100, or the heat dissipation characteristics of the antenna module can be improved by implementing a wide conductive layer.

Accordingly, since the slot 110 is filled with a dielectric with a higher permittivity than air, the size of the slot can be reduced. Various materials such as FR4 and Teflon, which are usually dielectric materials of a substrate, may be applied to the slot closing member 130.

In addition, since the size (an area) of the slot 110 is usually inversely proportional to the square root of the permittivity of a dielectric, it is preferable to use a dielectric having a permittivity between 2 and 10 as the slot closing member 130 in order to easily adjust the size of the slot 110 and manufacture the slot 110.

In addition, the slotted antenna including the slot closing member 130 can be manufactured very simply by inserting a liquid dielectric material into the space of the slot and hardening the liquid dielectric material after manufacturing the slotted antenna 100 by milling, die casting, or wire cutting.

Referring to FIG. 7, in the antenna module 1000 according to the fourth embodiment, at least one ground layer of a plurality of ground layers 231 constituting the shielding part 230 may be disposed to face the slot 110, with the signal transmission line 220 placed between the at least one ground layer and the slot 110.

In detail, the signal transmission line 220 connected to the RFIC 210 is disposed inside the package substrate 200, and the ground layer 231 is disposed on the rear side of the signal transmission line 220 so that the ground layer 231 disposed on the rear side can reflect a radio communication signal applied thereto, thereby improving the transmission efficiency of the radio communication signal.

In this case, the ground layers 231, the shield vias 232, and power and control signal lines 260 are required to be optimally arranged and connected so as not to interfere with each other.

Referring to FIG. 8, the slotted antenna 100 of the antenna module according to the fifth embodiment includes the slot 110, and the package substrate 200 may include a coupling part 240 configured to guide the movement of electromagnetic waves between the signal transmission line 220 and the slot 110.

In addition, the coupling part 240 may include a signal coupling layer 241 located in the signal transmission part 201, and a signal connection via 242 connecting the signal coupling layer 241 with the signal transmission line 220.

In detail, the signal coupling layer is formed on the signal connection part of the package substrate so that impedance matching and signal coupling between the slot 110 of the slotted antenna 100 and the signal connection part C are improved to have high signal transmission capability therebetween.

In this case, the signal coupling layer 241 may transmit a signal to the signal transmission line 220 through the signal connection via 242.

Furthermore, the signal coupling layer 241 of the package substrate 200 is positioned to face the slot 110 of the slotted antenna 100, and is preferably configured to be surrounded by the uppermost ground layer 231 of the package substrate 200.

Referring to FIG. 9, in the antenna module according to the sixth embodiment, the slotted antenna 100 may have the trenches 140 formed on the lower surface of the slotted antenna 100 facing the package substrate 200.

In detail, the package substrate 200 includes the RFICs 210, integrated circuit chips, passive elements, connectors, and the signal transmission lines 220, and when these components are formed on the lower surface of the package substrate 200, connection wiring is complicated especially on the lower surface, and the number of wiring layers inside the package substrate 200 for electrical connection increases. Accordingly, the trenches 140 are formed on the lower surface of the slotted antenna 100 facing the package substrate 200 so that components such as the RFIC 210, the passive element, the connector, and the signal transmission line 220 can be disposed on the upper surface of the package substrate 200 adjacent to the slotted antenna 100. In addition, signals generated by the components located in the trenches are shielded by the structural characteristics of the slotted antenna whose front or outer surface is configured as a conductor, so that a radio signal transmitted through the slot is not affected.

As described above, in a case in which components are freely arranged through the trenches 140, the power and control signal lines 260 may be formed on the lower surface of the package substrate 200, and thus analog signal routing wiring is away from the signal transmission line 220, so the analog signal of the power and control signal lines do not interfere with a radio communication signal.

That is, it is possible to solve the problem since it is challenging to implement an antenna module in a millimeter wave band, which is an ultra-high frequency, due to the occurrence of interference when a path through which a radio communication signal is transmitted and analog signal routing wiring are adjacent to each other, the package substrate 200 constituting the antenna module was required to be thick to secure an appropriate placement space.

To explain again, the trenches 140 are formed in the slotted antenna 100, and thus, the RFICs 210, other integrated circuit chips, passive elements, and connectors mounted to the package substrate 200 may be disposed on the lower surface of the package substrate 200 and on the upper surface of the package substrate 200 on which the slotted antenna 100 is mounted, thereby making the routing and placement of the package substrate 200 effective.

Referring to FIG. 10, the antenna module according to the seventh embodiment may include a heat dissipation part 300 coupled to a side surface of at least one of the slotted antenna 100 and the package substrate 200. Particularly, the outer surface of the slotted antenna is formed of a conductor. Thus, heat generated from the antenna module can be effectively dissipated from the conductive surface of the slotted antenna by the heat dissipation part.

In detail, since the antenna module of the present disclosure has a plurality of high-output semiconductor power device chips such as RFICs mounted therein, the antenna module may increase the output of a signal to be transmitted as the output of such RFICs increases and may receive a low signal.

Accordingly, more high-output devices are required to be mounted, and considerable heat is generated from these high-output devices.

Considerable heat is generated within the package substrate 200, and when this generated heat rises to a predetermined level or more, the heat degrades the characteristics of semiconductor devices, or separates bonded devices mounted on the substrate by causing deformation such as bending the substrate.

Accordingly, in the present disclosure, heat generated from the antenna module including the package substrate 200 can be effectively dissipated through the heat dissipation part 300.

In other words, in the case of the package substrate 200, the loss of a radio communication signal decreases as dielectric loss decreases. However, a material such as Teflon with low dielectric loss is expensive and has low thermal conductivity and mechanical characteristics, and thus is easily deformed by heat. Accordingly, heat is discharged through the heat dissipation part 300 to prevent a decrease in output loss of the antenna module and deformation of the package substrate due to heat generation.

In this case, the heat dissipation part may include a heat dissipation pad 410 coupled to the side surface of the antenna module formed by the combination of the slotted antenna 100 and the package substrate 200 by surrounding the side surface of the antenna module, and a plurality of heat dissipation fins 420 formed apart from each other on the outer side surface of the heat dissipation pad 410.

Referring to FIG. 11, the outer surface F of the slotted antenna 100 of the antenna module according to the eighth embodiment is formed of a conductor, and the inside I of the slotted antenna 100 may be formed of a different material having a density lower than the density of the conductor.

In detail, the slot 110 of the slotted antenna 100 serves as a path through which a radio communication signal is transmitted and received, so the side surface of the slot 110 must be made of a conductor (metal) material capable of shielding electromagnetic waves without loss.

In addition, in the case of a part in contact with the signal connection part of the package substrate, it is preferable in terms of reducing the loss of a transmitted radio communication signal that a lower conductor surface of the slotted antenna is in contact with the ground layer of the package substrate without a gap.

In addition, even the upper surface of the slotted antenna is preferably formed of a conductor in order to perform the function of an antenna.

Accordingly, a predetermined portion of the outer surface of the slotted antenna is required to be formed of a conductor, but the inside of the slotted antenna does not necessarily have to be formed of a conductor.

Accordingly, when the entirety of the slotted antenna 100 is made of a conductor, there is a problem that the weight of the antenna module increases. Therefore, only the outer surface F of the slotted antenna 100 that shields electromagnetic waves and guides the waves to pass through the slot 110 without signal loss is made of a conductor material, and the inside I of the slotted antenna is formed of different materials (a PCB material, an insulator such as a dielectric, foamed metal, and especially a light and flexible material) that are lighter than the material of which the outer surface is formed so that the weight of the slotted antenna 100 can be minimized.

In addition, the entire outer surface of the slotted antenna 100 may be formed of a plurality of materials instead of the same material. In detail, the inner and outer surfaces of the slot 110 are made of metal with excellent conductivity, and the lower surface of the slot 110 is made of metal with high thermal conductivity so that heat dissipation can be effectively achieved.

When the lower surface of the slotted antenna 100 is formed of metal having conductive properties and high thermal conductivity, it is obvious that heat dissipation through the slotted antenna can be effectively achieved.

In this case, metal having the above-described conductive properties and high thermal conductivity may include Al, Cu, Ag, or an alloy of these metals, but may include various other metals, so the metal is not limited thereto.

Referring to FIG. 12A, in the antenna module according to the ninth embodiment, a fixing recess 150 may be formed in the lower surface of the slotted antenna 100 facing the package substrate 200, and a fixing hole 250 corresponding to the fixing recess 150 may be drilled in the package substrate 200. The slotted antenna 100 and the package substrate 200 may be connected to each other by a fixing bolt 400 fastened to the fixing recess 150 and the fixing hole 250.

As mentioned above, the slot 110 of the slotted antenna 100 and the signal connection part C of the package substrate 200 are required to be located in one-to-one correspondence, and the lower surface of the slotted antenna 100 and the ground layer 231 surrounding the edge of the signal connection part C of the package substrate 200 are preferably in close contact with each other.

Accordingly, the fixing hole 250 and the fixing recess 150 for aligning the slotted antenna 100 and the package substrate 200 to be in contact with each other are formed in advance at a manufacturing step. In a coupling step, the fixing recess 150 of the slotted antenna 100 and the fixing hole 250 of the package substrate 200 are connected to each other by using the fixing bolt 400, so that the slotted antenna 100 and the package substrate 200 are aligned to a correct mating position, and the lower surface of the slotted antenna 100 and the upper surface of the package substrate 200 are in contact with each other without a gap.

In this case, since the ground layer 231 formed on the upper surface of the package substrate 200 is a very thin layer, substantially both the ground layer 231 and the signal connection part C can directly contact the lower surface of the slotted antenna 100.

Although the method of aligning and fixing the antenna module can be performed even with one fixing hole 250 and one fixing recess 150, the aligning and fixing can be more effectively achieved when a plurality of fixing holes and a plurality of fixing recesses are used.

Referring to FIGS. 13A and 13B, in the antenna module according to the tenth embodiment, a fixing bar 160 is formed on the lower surface of the slotted antenna 100 by protruding therefrom, and the package substrate 200 may have the fixing hole 250 to which the fixing bar 160 is coupled.

In detail, it is preferable that the slot 110 of the slotted antenna 100 and the signal connection part C of the package substrate 200 are required to be located in one-to-one correspondence with each other, and the lower surface of the slotted antenna 100 and the ground layer 231 surrounding the signal connection part C of the package substrate 200 are in contact with each other.

Accordingly, the fixing bar 160 is formed on the slotted antenna 100 in advance so that the slotted antenna 100 and the package substrate 200 are arranged to be in contact with each other, and the fixing hole 250 to which the fixing bar 160 is coupled is formed in the package substrate. When the fixing bar 160 of the slotted antenna is coupled to the fixing hole 250 of the package substrate, the lower surface of the slotted antenna 100 and the signal connection part C of the package substrate 200 are in contact with each other without a gap therebetween.

In this case, since the ground layer 231 formed on the upper surface of the package substrate 200 is a very thin layer, both the ground layer 231 and the signal connection part C may substantially be in direct contact with the lower surface of the slotted antenna 100.

Although the method of aligning and fixing the antenna module may be performed with one fixing bar 160 and one fixing hole 250, it is obvious that the effect is better when a plurality of fixing bars 160 and a plurality of fixing holes 250 are used.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An antenna module comprising:

a slotted antenna (100) having a slot (110) through which an electromagnetic wave passes; and a package substrate (200) allowing radio frequency integrated circuits (RFICs) (210) to be disposed thereon, the package substrate (200) having a signal transmission line (220) connected to each of the RFICs and configured to transmit and receive an electromagnetic wave, wherein:

the slotted antenna (100) is mounted on the package substrate (200);

the package substrate (200) comprises a shielding part (230) disposed in a form surrounding the signal transmission line (220); and the shielding part (230) comprises:

a plurality of ground layers (231) formed in dielectric layers (200A) constituting the package substrate (200); and shield vias (232) connecting the ground layers (231) to each other.

2. The antenna module of claim 1, wherein the slotted antenna (100) and the package substrate (200) are separately made and then the slotted antenna (100) is mounted on the package substrate (200).

3. The antenna module of claim 1, wherein the slot (110) comprises a plurality of slots spaced apart at predetermined intervals from each other in the slotted antenna (100) to form an array.

4. The antenna module of claim 3, wherein a shielding part (230) is disposed in a form surrounding the slot (110) to form a signal transmission part (201) in a center of the shielding part (230).

5. The antenna module of claim 1, wherein one ground layer of the plurality of ground layers (231) is disposed to face the slot (110) with the signal transmission line (220) placed between the one ground layer and the slot.

6. The antenna module of claim 1, wherein the slotted antenna (100) comprises a ridge-forming protrusion (120) protruding toward the slot (110).

7. The antenna module of claim 6, wherein the ridge-forming protrusion (120) comprises a plurality of ridge-forming protrusions.

8. The antenna module of claim 1, wherein the slotted antenna (100) comprises a slot closing member (130) provided in the slot (110), wherein the slot closing member (130) is a dielectric.

9. The antenna module of claim 8, wherein the slot closing member (130) has a permittivity greater than or equal to 2 and less than or equal to 10.

10. The antenna module of claim 1, wherein the package substrate (200) comprises a coupling part (240) configured to guide movement of an electromagnetic wave between the signal transmission line (220) and the slot (110).

11. The antenna module of claim 1, wherein the slotted antenna (100) comprises trenches (140) formed on a lower surface of the slotted antenna (100) facing the package substrate (200).

12. The antenna module of claim 1, wherein an outer surface of the slotted antenna (100) is formed of a conductor, and an inside of the slotted antenna (100) is formed of a material having a density lower than a density of the conductor.

13. The antenna module of claim 1, further comprising:

a heat dissipation part (300) coupled to a side surface of at least one of the slotted antenna (100) and the package substrate (200).

14. The antenna module of claim 1, wherein the slotted antenna (100) comprises a fixing bar (160) formed on the lower surface of the slotted antenna (100) facing the package substrate (200), and the package substrate (200) comprises a fixing hole (250) formed at a position facing the fixing bar (160), with the fixing bar (160) coupled to the fixing hole (250).

15. An antenna module comprising:

a slotted antenna (100) having a slot (110) through which an electromagnetic wave passes; and a package substrate (200) allowing radio frequency integrated circuits (RFICs) (210) to be disposed thereon, the package substrate (200) having a signal transmission line (220) connected to each of the RFICs and configured to transmit and receive an electromagnetic wave, wherein:

the slotted antenna (100) is mounted on the package substrate (200);

the slotted antenna (100) comprises a fixing recess (150) formed on the lower surface of the slotted antenna (100) facing the package substrate (200);

the package substrate (200) comprises a fixing hole (250) formed to face the fixing recess (150); and a fixing bolt (400) is fastened to the fixing recess (150) and the fixing hole (250).

* * * * *